Patented Aug. 11, 1953

2,648,708

UNITED STATES PATENT OFFICE 2,648,708

BENZAMIDE DERIVATIVES

Norbert Steiger, Nutley, N. J., assignor to Hoffmann-La Roche Inc., Nutley, N. J., a corporation of New Jersey No Drawing. Application May 1, 1951,
Serial No. 224,067

6 Claims. (Cl. 260—558)

This invention relates to amino-N-[hydroxyethyl(aminoethylene)$_n$]benzamides, wherein $n$ is a small integer, e. g., 1, 2, etc., and their manufacture. The new compounds are of interest in the field of cardio-active agents. They are also useful as intermediates in the preparation of compounds which are of interest in combatting virus infections, such as are disclosed and claimed in my co-pending application, Ser. No. 143,150, filed February 8, 1950, now U. S. Patent No. 2,551,647, of which the instant application is a continuation-in-part.

The compounds comprising the invention can be prepared by reacting a nitrobenzoyl chloride, which may be substituted or unsubstituted, with an amino(ethyleneamino)$_n$ethanol to form the corresponding nitro-N-[hydroxyethyl(aminoethylene)$_n$]benzamides; and reducing the latter to form the corresponding amino-N-[hydroxyethyl-(aminoethylene)$_n$]benzamides; $n$ having the same significance already assigned thereto.

The following examples will serve to illustrate the invention.

EXAMPLE 1 p-Amino-N-[β-(β-hydroxyethylamino)ethyl]benzamide

To 400 cc. of water, 125 grams of β-(β-aminoethylamino)ethanol and 60 grams of sodium carbonate there were added 186 grams of p-nitrobenzoylchloride while stirring at 75–90° C. The stirring was continued for 4 hours at 90° C. after which the reaction mixture was diluted with 1000 cc. of water. Upon standing for 16 hours, crystals of p-nitro-N-[β-(β-hydroxyethylamino)-ethyl]benzamide were formed. The crystals were filtered off and washed with three 100 cc. portions of ice water.

240 grams of iron filings, 700 cc. of water and 10 cc. of acetic acid were refluxed for 30 minutes and the prepared p-nitro-N-[β-(β-hydroxyethylamino)ethyl]benzamide was added thereto at 90–100° C. together with 150 cc. of water. The mixture was refluxed for 4 hours, and 55 cc. of 20% solution of sodium carbonate and 300 cc. of water added thereto at 90° C. 10 grams of a filter aid were added, the mixture was refluxed and then filtered at 95–100° C. The filter cake was washed with 500 cc. of boiling water, and the filtrate treated with 350 grams of sodium chloride and stirred. The p-amino-N-[β-(β-hydroxyethylamino)ethyl]benzamide crystallized, M. P. 167–169° C.

EXAMPLE 2 m-Amino-N-[β-(β-hydroxyethylamino)ethyl]-benzamide

To 400 cc. of water, 125 grams of β-(β-aminoethylamino)ethanol, and 60 grams of sodium carbonate there were added 186 grams of m-nitrobenzoylchloride with stirring at 75–90° C. The stirring was continued for 4 hours at 90° C. after which 1000 cc. of water were added to the reaction mixture. Upon standing for 16 hours, crystals of m-nitro-N-[β-(β-hydroxyethylamino)ethyl]benzamide were formed. They were filtered and washed with three 100 cc. portions of ice water. 230 grams of iron filings, 10 cc. of acetic acid and 500 cc. of water were refluxed for 30 minutes and then there was added thereto the above prepared m-nitro-N-[β-(β-hydroxyethylamino)ethyl]benzamide and 150 cc. of water. The mixture was refluxed for 4 hours, and 55 cc. of 20% sodium carbonate and 300 cc. of water added thereto at 95–97° C. 10 grams of a filter aid were added, the mixture was refluxed, and then filtered at 95–100° C. The filter cake was washed with 500 cc. of boiling water and to the filtrate were added 350 grams of sodium chloride. The m-amino-N-[β-(β-hydroxyethylamino)ethyl]benzamide was obtained as a viscous oil.

EXAMPLE 3 o-Amino-N-[β-(β-hydroxyethylamino)ethyl]-benzamide

To a solution prepared from 70 cc. of β-(β-aminoethylamino)ethanol, 50 grams of sodium carbonate and 250 cc. of water were added at about 40° C. 86 grams of o-nitrobenzoyl chloride. The mixture was stirred for one-half hour at 40° C. and then for an additional hour at 55 to 60° C. The reaction mixture was cooled to 10° C. and the mother liquor decanted from the o-nitro-N-[β-(β-hydroxyethylamino)ethyl]benzamide thus formed. The latter was added to a mixture prepared from 180 grams of iron filings, 15 cc. of acetic acid and 500 cc. of water and the resulting mixture heated at 100° C. for about 6 hours. The reaction mixture was then neutralized by the addition of 25 grams of sodium carbonate, filtered at 95° C. and the filter cake washed with 400 cc. of boiling water. To the filtrate were added 250 grams of sodium chloride. The o-amino-N-[β-(β-hydroxyethylamino)ethyl]-benzamide was obtained as a viscous oil.

EXAMPLE 4

3-amino-6-chloro-N-[β-(β-hydroxyethylamino)-ethyl]benzamide 210 grams of 3-nitro-6-chloro-benzoyl chloride were added at 60–75° C. to a solution prepared from 115 grams of β-(β-aminoethylamino)ethanol, 80 grams of sodium carbonate, and 400 cc. of water. The mixture was stirred for one hour at 85–90° C. A product was obtained which solidified on cooling. The 3-nitro-6-chloro-N-[β-(β-hydroxyethylamino)ethyl]benzamide thus obtained was filtered and washed with water. 30 grams of the compound were added to a mixture of 33 grams of iron filings, 3 cc. of acetic acid, 300 cc. of water and 30 cc. of ethanol and the resulting mixture heated at 100° C. for 4 hours. 8 grams of sodium carbonate in 100 cc. of water were then added to the reaction mixture and the latter filtered at 95° C. To the filtrate were added 90 grams of sodium chloride. The 3-amino-6-chloro-N-[β-(β-hydroxyethylamino)ethyl]benzamide was obtained as an oil.

EXAMPLE 5 m-Amino-N-{β-[β-(β-hydroxyethylamino)-ethylamino]ethyl}benzamide 82 grams of β-bromo ethylamine hydrobromide, 41.5 grams of β-(β-aminoethylamino)ethanol, and 80 cc. of water were refluxed at 112° C. for 20 hours. To the solution were added 40 cc. of sodium hydroxide (40% by volume) at 30° C., whereupon there was obtained a solution of β-[β-(β-aminoethylamino)ethylamino]ethanol. To the solution were added 40 grams of sodium carbonate and then 75 grams of m-nitrobenzoyl chloride were added at about 40° C. The mixture was stirred for 15 minutes at 40° C. and stirring was continued for an additional hour at 60–70° C. Upon cooling the reaction mixture below 20° C., m-nitro-N-{β-[β-(β-hydroxyethylamino)ethyl-aminoethyl}benzamide solidified. It was filtered off and added to a mixture of 120 grams of iron filings, 15 cc. of acetic acid and 500 cc. of water and heated at 100° C. for 5 hours. To the reaction mixture were added 30 grams of sodium carbonate, and the mixture was filtered at 95° C. The filter cake was washed with 200 cc. of boiling water. To the filtrate were added 150 grams of sodium chloride. The m-amino-N-{β-[β-(β-hydroxyethylamino)ethylamino]ethyl}benzamide was obtained as an oil.

I claim:
1. p-Amino-N-[β-(β-hydroxyethylamino)ethyl]benzamide.
2. m-Amino-N-[β-(β-hydroxyethylamino)ethyl]benzamide.
3. o-Amino-N-[β-(β-hydroxyethylamino)ethyl]benzamide.
4. 3-amino-6-chloro-N-[β-(β-hydroxyethylamino)ethyl]benzamide.
5. m-Amino-N-{β-[β-(β-hydroxyethylamino)ethylamino]ethyl}benzamide.
6. A compound having the formula

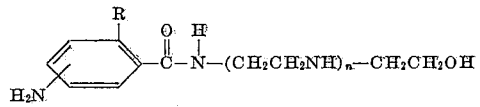

wherein R represents a member selected from the group consisting of H and Cl, and n represents a small integer.

NORBERT STEIGER.

References Cited in the file of this patent

UNITED STATES PATENTS

| Number | Name | Date |
|---|---|---|
| 2,452,313 | Morgan | Oct. 26, 1948 |

FOREIGN PATENTS

| Number | Country | Date |
|---|---|---|
| 500,476 | Great Britain | Feb. 6, 1939 |